US010940844B2

(12) United States Patent
Kobayashi et al.

(10) Patent No.: US 10,940,844 B2
(45) Date of Patent: Mar. 9, 2021

(54) VEHICULAR BRAKE DEVICE

(71) Applicant: ADVICS CO., LTD., Kariya (JP)

(72) Inventors: Tatsushi Kobayashi, Kariya (JP);
Takayuki Yamamoto, Nagakute (JP);
Yasuhito Ishida, Toyokawa (JP)

(73) Assignee: ADVICS CO., LTD., Kariya (JP)

( * ) Notice: Subject to any disclaimer, the term of this patent is extended or adjusted under 35 U.S.C. 154(b) by 21 days.

(21) Appl. No.: 16/335,410

(22) PCT Filed: Sep. 7, 2017

(86) PCT No.: PCT/JP2017/032260
§ 371 (c)(1),
(2) Date: Mar. 21, 2019

(87) PCT Pub. No.: WO2018/056063
PCT Pub. Date: Mar. 29, 2018

(65) Prior Publication Data
US 2020/0039490 A1    Feb. 6, 2020

(30) Foreign Application Priority Data

Sep. 21, 2016 (JP) .................................. 2016-184767

(51) Int. Cl.
*B60T 13/66* (2006.01)
*B60T 8/17* (2006.01)
(Continued)

(52) U.S. Cl.
CPC ............... *B60T 13/66* (2013.01); *B60T 8/17* (2013.01); *B60T 8/3265* (2013.01); *B60T 8/367* (2013.01); *B60T 8/4854* (2013.01); *B60T 13/745* (2013.01)

(58) Field of Classification Search
CPC .......... B60T 8/17; B60T 8/3265; B60T 8/367; B60T 8/4854; B60T 13/66; B60T 13/745
See application file for complete search history.

(56) References Cited

U.S. PATENT DOCUMENTS

2005/0269875 A1    12/2005 Maki et al.
2006/0131951 A1*   6/2006 Nakayama ............ B60T 8/4081
                                                    303/9.64
(Continued)

FOREIGN PATENT DOCUMENTS

JP    2006096218 A    4/2006
JP    2015047949 A    3/2015
JP    2015085872 A    5/2015

OTHER PUBLICATIONS

International Search Report (PCT/ISA/210) dated Dec. 12, 2017, by the Japanese Patent Office as the International Searching Authority for International Application No. PCT/JP2017/032260.

*Primary Examiner* — Melody M Burch
(74) *Attorney, Agent, or Firm* — Buchanan Ingersoll & Rooney PC (57) ABSTRACT

The vehicular brake device includes a determination unit, a ratio setting unit, and the control unit. The determination unit determines the operating condition of a vehicular brake device. The ratio setting unit sets, on the basis of the result of determination by the determination unit, a first ratio which is the ratio of a wheel pressure generated by a piston drive unit to a target wheel pressure, and a second ratio which is the ratio of a wheel pressure generated by a hydraulic pressure adjusting unit to the target wheel pressure. The control unit controls the piston drive unit and the hydraulic pressure adjusting unit on the basis of the first ratio and the second ratio.

8 Claims, 5 Drawing Sheets

(51) Int. Cl.
*B60T 8/32* (2006.01)
*B60T 8/36* (2006.01)
*B60T 8/48* (2006.01)
*B60T 13/74* (2006.01)

(56) References Cited

U.S. PATENT DOCUMENTS

2008/0001473 A1* 1/2008 Mizutani ............... B60T 8/4081
 303/113.5
2012/0112525 A1* 5/2012 Shimada ................. B60T 8/442
 303/10
2015/0061362 A1 3/2015 Kikawa et al.

* cited by examiner

VEHICULAR BRAKE DEVICE

TECHNICAL FIELD

The present disclosure relates to a vehicular brake device.

BACKGROUND ART

As one example, a vehicular brake device includes a piston drive unit that drives a piston slidably disposed in a master cylinder and an actuator that is disposed between a master chamber provided in the master cylinder and a wheel cylinder and regulates a wheel pressure which is a hydraulic pressure in the wheel cylinder on the basis of a master pressure which is a hydraulic pressure in the master chamber generated in accordance with the driving of the piston. In general, in the vehicular brake device that controls the driving of the piston to increase or decrease the master pressure, the actuator has no pressurizing function from the viewpoint of cost reduction and the like, and the wheel pressure is increased on the assumption that the master pressure is increased. In this configuration, an electronically controllable pressure source is only the piston drive unit. For example, Japanese Patent Application Laid-Open No. 2015-85872 discloses a vehicular brake device including such a piston drive unit and an actuator.

On the other hand, for example, there is a vehicular brake device of a vehicle (hybrid vehicle) equipped with a regenerative brake device. In the vehicular brake device, an actuator has a pressurizing function, and the master pressure is increased by only the depressing force of the driver or both the depressing force and a negative pressure booster. Also in this case, the electronically controllable pressure source is only the actuator. A vehicular brake device having such a configuration is described in, for example, Japanese Patent Application Laid-Open No. 2006-96218.

CITATIONS LIST

Patent Literature

Patent Literature 1: Japanese Patent Application Laid-Open No. 2015-85872
Patent Literature 2: Japanese Patent Application Laid-Open No. 2006-96218

SUMMARY OF INVENTION

Technical Problems

However, in the configuration in which there is only one electronically controllable pressure source as described above, redundancy of pressurized configuration as a system is poor. In a vehicular brake device of a hybrid vehicle using an actuator as a pressure source, from the viewpoint of regeneration efficiency, for example, an ineffective stroke mechanism in which no master pressure is generated at the beginning of operation is provided, and there has been room for improvement in initial responsiveness.

The present disclosure has been made in view of such circumstances, and it is an object of the present disclosure to provide a vehicular brake device capable of imparting redundancy to pressurized configuration and improving responsiveness according to circumstances.

Solutions to Problems

The present disclosure is a vehicular brake device including a master cylinder, a piston drive unit, a hydraulic pressure path, a hydraulic pressure adjusting unit, a determination unit, a target wheel pressure setting unit, a ratio setting unit, and a control unit. The master cylinder includes a master piston and a master chamber whose volume changes with movement of the master piston. The piston drive unit drives the master piston by a force corresponding to a hydraulic pressure of an accumulation unit or a driving force of a motor constituting an electric booster and controls a master pressure which is a hydraulic pressure in the master chamber. The hydraulic pressure path connects the master chamber and a wheel cylinder. The hydraulic pressure adjusting unit includes a pump discharging a fluid to the hydraulic pressure path and is configured to be able to pressurize a wheel pressure which is a hydraulic pressure of the wheel cylinder. The determination unit determines an operating condition of the vehicular brake device. The target wheel pressure setting unit sets a target wheel pressure which is a target value of the wheel pressure. The ratio setting unit sets, on the basis of a determination result of the determination unit, a first ratio which is a ratio of the wheel pressure generated by the piston drive unit out of the target wheel pressure and a second ratio which is a ratio of the wheel pressure generated by the hydraulic pressure adjusting unit out of the target wheel pressure. The control unit controls the piston drive unit and the hydraulic pressure adjusting unit on the basis of the first ratio and the second ratio.

Advantageous Effects of Invention

According to the present disclosure, there are provided two pressure sources that are controllable by the control unit and capable of pressurizing the wheel pressure, and redundancy of pressurized configuration is secured. In addition, since the first ratio relating to the piston drive unit having relatively high responsiveness is set according to the operating condition of the vehicular brake device, responsiveness can be improved according to the situation, including an initial stage of start of brake operation, for example.

DESCRIPTION OF EMBODIMENT

Hereinafter, an embodiment in which a vehicular device according to the present disclosure is applied to a vehicle will be described with reference to the drawings. Meanwhile, each of the drawings used for illustrating is a conceptual diagram, and the shape of each part is not necessarily strict in some cases.

Figure 1:
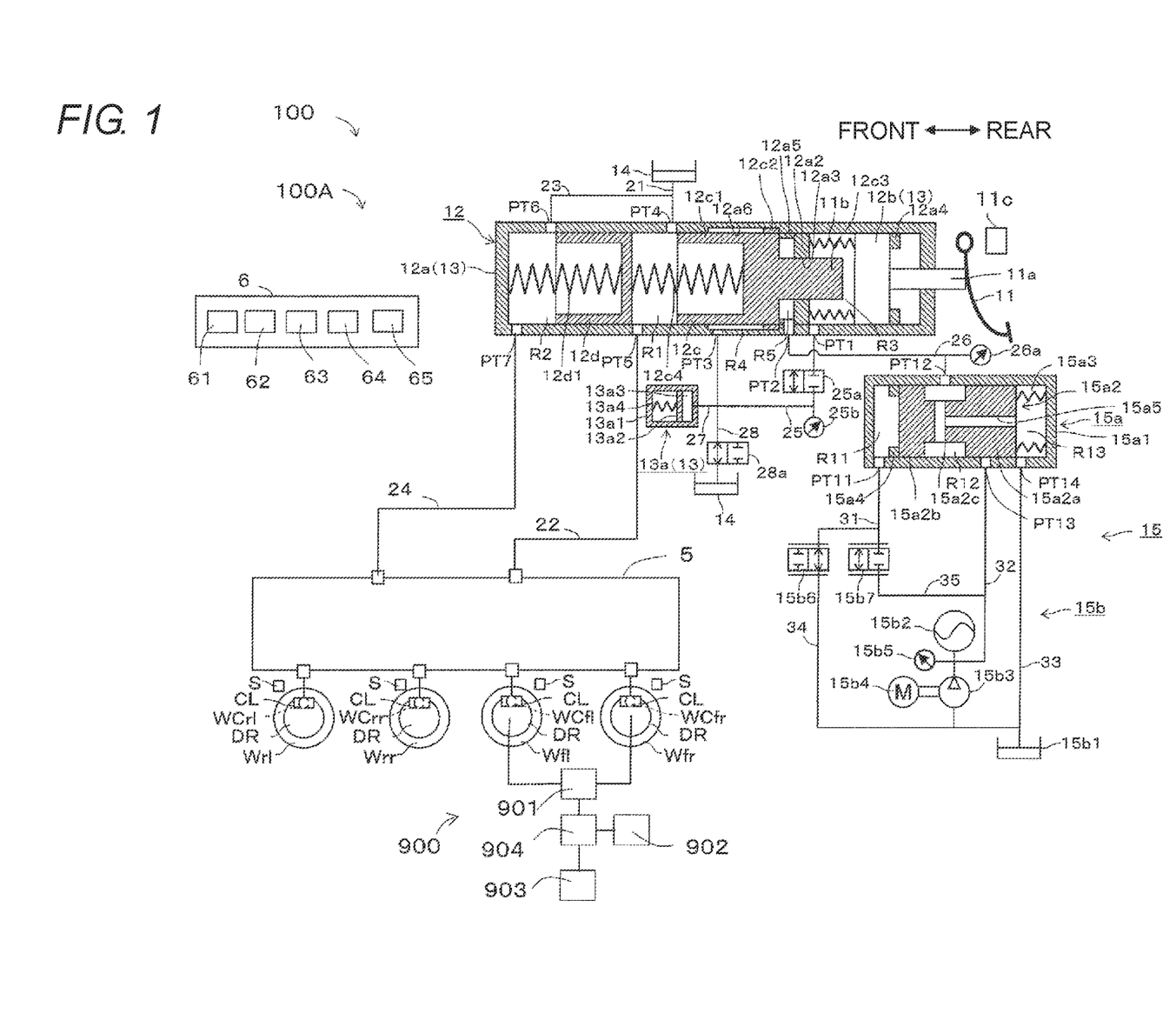
FIG. 1 is a configuration diagram showing a configuration of a vehicular brake device of the present embodiment.

The vehicle is provided with a vehicular brake device 100 that applies braking force to wheels Wfl, Wfr, Wrl, and Wrr (hereinafter also collectively referred to as a wheel W, a front wheel Wf, and a rear wheel Wr) to brake the vehicle. The vehicle of the present embodiment is a front-wheel-drive hybrid vehicle and includes a regenerative brake device 900 that generates regenerative braking force on the front wheel Wf. That is, as shown in FIG. 1, the vehicular brake device 100 includes the regenerative brake device 900 and a hydraulic brake device 100A.

The regenerative brake device 900 is a device that applies regenerative braking force, obtained by converting kinetic energy of the vehicle into electric energy, to the wheel W (in this case, the front wheel Wf). Specifically, the regenerative brake device 900 includes a generator 901 provided on a drive shaft of the front wheel Wf, a hybrid ECU 902 configured to perform regenerative cooperation, a battery 903, and an inverter 904. The operation of the regenerative brake device 900 is well known, and a detailed description thereof will be omitted.

The hydraulic brake device 100A is a device that applies hydraulic braking force, corresponding to hydraulic pressure in wheel cylinders WCfl, WCfr, WCrl, and WCrr (hereinafter also collectively referred to as a wheel cylinder WC), to the wheels W. Specifically, the hydraulic brake device 100A includes a brake pedal 11, a master cylinder 12, a stroke simulator unit 13, a reservoir 14, a booster mechanism (corresponding to a "piston drive unit") 15, an actuator (corresponding to a "hydraulic pressure adjusting unit") 5, a brake ECU 6, and the wheel cylinder WC.

The wheel cylinder WC regulates rotation of the wheel W and is provided in a caliper CL. The wheel cylinder WC is a braking force imparting mechanism that is supplied with brake fluid (corresponding to "fluid") from the actuator 5 and applies the braking force to the wheels W of the vehicle on the basis of wheel pressure that is the hydraulic pressure in the wheel cylinder WC. When the brake fluid is supplied to the wheel cylinder WC, each piston (not shown) of the wheel cylinder WC presses a pair of brake pads (not shown), which are friction members, to sandwich a disc rotor DR, which is a rotation member rotating integrally with the wheel W, from both sides, and its rotation is regulated. In the present embodiment, although a disc type brake is adopted, a drum type brake may be adopted.

The brake pedal 11 is a kind of a brake operation member and is connected to the stroke simulator unit 13 and the master cylinder 12 via an operation rod 11a.

In the vicinity of the brake pedal 11, there is provided a stroke sensor 11c that detects a brake pedal stroke (operation amount: hereinafter also referred to as a stroke) which is a brake operation state due to depression of the brake pedal 11. The stroke sensor 11c is connected to the brake ECU 6 and is configured such that a detection signal (detection result) is output to the brake ECU 6 via a communication line.

The master cylinder 12 supplies the brake fluid to the actuator 5 according to the operation amount of the brake pedal 11, and is constituted by a cylinder body 12a, an input piston 12b, a first master piston 12c, a second master piston 12d, and so on.

The cylinder body 12a is formed in a substantially cylindrical shape with a bottom. A partition wall portion 12a2 protruding inwardly in a flange shape is provided on an inner peripheral portion of the cylinder body 12a. At the center of the partition wall portion 12a2, a through hole 12a3 penetrating in the front-rear direction is formed. In the inner peripheral portion of the cylinder body 12a, the first master piston 12c and the second master piston 12d are arranged so as to be liquid-tight and moveable in the axial direction at a portion forward of the partition wall portion 12a2.

In the inner peripheral portion of the cylinder body 12a, an input piston 12b is disposed so as to be liquid-tight and moveable in the axial direction at a portion behind the partition wall portion 12a2. The input piston 12b is a piston sliding in the cylinder body 12a in response to operation of the brake pedal 11.

The operation rod 11a interlocking with the brake pedal 11 is connected to the input piston 12b. The input piston 12b is biased in a direction in which a first hydraulic pressure chamber R3 is expanded by a compression spring 11b, that is, rearward (rightward in the drawing). When the brake pedal 11 is depressed, the operation rod 11a advances against the biasing force of the compression spring 11b. Along with the advancement of the operation rod 11a, the input piston 12b also advances interlockingly. When the depressing operation of the brake pedal 11 is canceled, the input piston 12b retreats by the biasing force of the compression spring 11b, and the input piston 12b is abutted against a restricting protrusion 12a4 to be positioned.

In the first master piston 12c, a pressure cylinder portion 12c1, a flange portion 12c2, and a protruding portion 12c3 are integrally formed in order from the front side. The pressure cylinder portion 12c1 is formed in a substantially bottomed cylindrical shape with an opening in the front and is disposed so as to be liquid-tight and slidable against an inner peripheral surface of the cylinder body 12a. A coil spring 12c4 which is a biasing member is disposed between an inner space of the pressure cylinder portion 12c1 and the second master piston 12d. The first master piston 12c is biased rearward by the coil spring 12c4. In other words, the first master piston 12c is biased rearward by the coil spring 12c4, and finally is abutted against the restricting protrusion 12a5 to be positioned. This position is an original position (preset) when the depressing operation of the brake pedal 11 is canceled.

The flange portion 12c2 is formed to be larger in diameter than the pressure cylinder portion 12c1 and is disposed so as to be liquid-tight and slidable against an inner peripheral surface of a large diameter portion 12a6 in the cylinder body 12a. The protruding portion 12c3 is formed to be smaller in diameter than the pressure cylinder portion 12c1 and is disposed so as to liquid-tightly slide relative to the through hole 12a3 of the partition wall portion 12a2. A rear end portion of the protruding portion 12c3 passes through the through hole 12a3, protrudes into an inner space of the cylinder body 12a, and is spaced apart from the inner peripheral surface of the cylinder body 12a. A rear end surface of the protruding portion 12c3 is configured to be spaced apart from a bottom surface of the input piston 12b so that its separation distance can be changed.

The second master piston 12d is disposed on the front side of the first master piston 12c in the cylinder body 12a. The second master piston 12d is formed in a substantially bottomed cylindrical shape with an opening in the front. A coil spring 12d1 which is a biasing member is disposed between an inner space of the second master piston 12d and an inner bottom surface of the cylinder body 12a. The second master piston 12d is biased rearward by the coil spring 12d1. In other words, the second master piston 12d is biased by the coil spring 12d1 toward a set original position.

In the master cylinder 12, a first master chamber R1, a second master chamber R2, the first hydraulic pressure chamber R3, a second hydraulic pressure chamber R4, and a servo chamber (hydraulic pressure chamber) R5 are formed. In the description, the first master chamber R1 and the second master chamber R2 may be referred to collectively as master chambers R1 and R2. The first master chamber R1 is defined by the inner peripheral surface of the cylinder body 12a, the first master piston 12c (the front side of the pressure cylinder portion 12c1), and the second master piston 12d. The first master chamber R1 is connected to the reservoir 14 via a hydraulic passage 21 connected to a port PT4. Further, the first master chamber R1 is connected to the actuator 5 via a hydraulic passage 22 connected to a port PT5.

The second master chamber R2 is defined by the inner peripheral surface of the cylinder body 12a and the front side of the second master piston 12d. The second master chamber R2 is connected to the reservoir 14 via a hydraulic passage 23 connected to a port PT6. Further, the second master chamber R2 is connected to the actuator 5 via a hydraulic passage 24 connected to a port PT7.

The first hydraulic pressure chamber R3 is formed between the partition wall portion 12a2 and the input piston 12b and defined by the inner peripheral surface of the cylinder body 12a, the partition wall portion 12a2, the protruding portion 12c3 of the first master piston 12c, and the input piston 12b. The second hydraulic pressure chamber R4 is formed on the side of the pressure cylinder portion 12c1 of the first master piston 12c and is defined by the inner peripheral surface of the large diameter portion 12a6 of the inner peripheral surface of the cylinder body 12a, the pressure cylinder portion 12c1, and the flange portion 12c2. The first hydraulic pressure chamber R3 is connected to the second hydraulic pressure chamber R4 via a hydraulic passage 25 and a port PT3 connected to a port PT1.

The servo chamber R5 is formed between the partition wall portion 12a2 and the pressure cylinder portion 12c1 of the first master piston 12c and defined by the inner peripheral surface of the cylinder body 12a, the partition wall portion 12a2, the protruding portion 12c3 of the first master piston 12c, and the pressure cylinder portion 12c1. The servo chamber R5 is connected to an output chamber R12 via a hydraulic passage 26 connected to a port PT2.

A pressure sensor 26a is a sensor that detects servo pressure supplied to the servo chamber R5 and is connected to the hydraulic passage 26. The pressure sensor 26a transmits a detection signal (detection result) to the brake ECU 6. The servo pressure detected by the pressure sensor 26a is an actual value of the hydraulic pressure in the servo chamber R5 and is hereinafter referred to as the actual servo pressure (actual hydraulic pressure).

The stroke simulator unit 13 includes the cylinder body 12a, the input piston 12b, the first hydraulic pressure chamber R3, and a stroke simulator 13a communicating with the first hydraulic pressure chamber R3.

The first hydraulic pressure chamber R3 communicates with the stroke simulator 13a via hydraulic passages 25 and 27 connected to the port PT1. The first hydraulic pressure chamber R3 communicates with the reservoir 14 via a connection hydraulic passage (not shown).

The stroke simulator 13a causes the brake pedal 11 to generate a stroke (reaction force) with a magnitude corresponding to the operation state of the brake pedal 11. The stroke simulator 13a includes a cylinder portion 13a1, a piston portion 13a2, a reaction force hydraulic pressure chamber 13a3, and a spring 13a4. The piston portion 13a2 liquid-tightly slides in the cylinder portion 13a1 in accordance with the brake operation for operating the brake pedal 11. The reaction force hydraulic pressure chamber 13a3 is formed so as to be partitioned between the cylinder portion 13a1 and the piston portion 13a2. The reaction force hydraulic pressure chamber 13a3 communicates with the first hydraulic pressure chamber R3 and the second hydraulic pressure chamber R4 via the connected hydraulic passages 27 and 25. The spring 13a4 biases the piston portion 13a2 in a direction to decrease the volume of the reaction force hydraulic pressure chamber 13a3.

In the hydraulic passage 25, a first electromagnetic valve 25a which is a normally closed type electromagnetic valve is provided. In a hydraulic passage 28 connecting the hydraulic passage 25 and the reservoir 14, a second electromagnetic valve 28a which is a normally open type electromagnetic valve is provided. When the first electromagnetic valve 25a attains a closed state, the first hydraulic pressure chamber R3 and the second hydraulic pressure chamber R4 are disconnected. As a result, the input piston 12b and the first master piston 12c are interlocked while maintaining a constant separation distance. When the first electromagnetic valve 25a is in the open state, the first hydraulic pressure chamber R3 and the second hydraulic pressure chamber R4 are communicated with each other. As a result, a volumetric change of the first hydraulic pressure chamber R3 and the second hydraulic pressure chamber R4 due to the advance and retraction of the first master piston 12c is absorbed by the movement of the brake fluid.

Further, in the hydraulic passage 25, a pressure sensor (corresponding to "detection unit") 25b is installed. The pressure sensor 25b is a sensor that detects reaction force hydraulic pressure in the second hydraulic pressure chamber R4 and the first hydraulic pressure chamber R3. The pressure sensor 25b is also an operation force sensor for detecting operation force applied to the brake pedal 11 and has a correlation with the operation amount of the brake pedal 11. The pressure sensor 25b detects the pressure in the second hydraulic pressure chamber R4 when the first electromagnetic valve 25a attains a closed state, and when the first electromagnetic valve 25a attains an open state, the pressure sensor 25b detects the pressure (or reaction force hydraulic pressure) in the communicated first hydraulic pressure chamber R3. The pressure sensor 25b transmits a detection signal (detection result) to the brake ECU 6. (Booster mechanism)

The booster mechanism 15 generates a servo pressure in response to the operation amount of the brake pedal 11. The booster mechanism 15 is a hydraulic pressure generating device which outputs output pressure (in this embodiment, the servo pressure) by the operation of the inputted input pressure (in this embodiment, the pilot pressure) and generates a response delay in which the output pressure relative to the input pressure is delayed at the initial stage of starting of the pressure increasing operation or the pressure decreasing operation when the output pressure is intended to be increasing or decreasing. The booster mechanism 15 includes a regulator 15a and a pressure supply device 15b.

The regulator 15a is configured to have a cylinder body 15a1 and a spool 15a2 which slides in the cylinder body 15a1. The regulator 15a includes a pilot chamber R11, the output chamber R12, and a third hydraulic pressure chamber R13.

The pilot chamber R11 is defined by the cylinder body 15a1 and a front end surface of a second large diameter portion 15a2b of the spool 15a2. The pilot chamber R11 is connected to a pressure decreasing valve 15b6 and a pressure increasing valve 15b7 (hydraulic passage 31) which are connected to a port PT11. A restricting protrusion 15a4 is provided on an inner peripheral surface of the cylinder body 15a1 to position the spool 15a2 by abutting the front end surface of the second large diameter portion 15a2b against the restricting protrusion 15a4.

The output chamber R12 is defined by the cylinder body 15a1 and a small diameter portion 15a2c of the spool 15a2, a rear end surface of the second large diameter portion 15a2b and a front end surface of the first large diameter portion 15a2a. The output chamber R12 is connected to the servo chamber R5 of the master cylinder 12 via the hydraulic passage 26 which is connected to a port PT12 and the port PT2. Further, the output chamber R12 is connectible with an accumulator 15b2 via a hydraulic passage 32 connected to a port PT13.

The third hydraulic pressure chamber R13 is defined by the cylinder body 15a1 and a rear end surface of the first large diameter portion 15a2a of the spool 15a2. The third hydraulic pressure chamber R13 is connectible with a reservoir 15b1 via a hydraulic passage 33 connected to a port PT14. A spring 15a3, which biases in a direction in which the volume of the third hydraulic pressure chamber R13 increases, is disposed in the third hydraulic pressure chamber R13.

The spool 15a2 is formed by the first large diameter portion 15a2a, the second large diameter portion 15a2b, and the small diameter portion 15a2c. The first large diameter portion 15a2a and the second large diameter portion 15a2b are configured to liquid-tightly slide within the cylinder body 15a1. The small diameter portion 15a2c is disposed between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b.

Further, a communication passage 15a5 which connects the output chamber R12 and the third hydraulic pressure chamber R13 is formed in the spool 15a2.

The pressure supply device 15b also serves as a drive unit that drives the spool 15a2. The pressure supply device 15b includes a reservoir 15b1 which is a low pressure source, an accumulator (corresponding to "accumulation unit") 15b2 which is a high pressure source that accumulates the brake fluid, a pump 15b3 which pumps the brake fluid sucked from the reservoir 15b1 into the accumulator 15b2, and an electric motor 15b4 which drives the pump 15b3. The reservoir 15b1 is exposed to the atmospheric pressure, and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 6.

Further, the pressure supply device 15b is provided with the pressure decreasing valve 15b6 and the pressure increasing valve 15b7. The pressure decreasing valve 15b6 is an electromagnetic valve which opens in a non-energized state (normally open type). The flow-rate of the pressure decreasing valve 15b6 is controlled by the instructions from the brake ECU 6. One side of the pressure decreasing valve 15b6 is connected to the pilot chamber R11 via the hydraulic passage 31, and the other side thereof is connected to the reservoir 15b1 via a hydraulic passage 34. The pressure increasing valve 15b7 is an electromagnetic valve which closes in a non-energized state (normally closed type). The flow-rate of the pressure increasing valve 15b7 is controlled by the instructions from the brake ECU 6. One side of the pressure increasing valve 15b7 is connected to the pilot chamber R11 via the hydraulic passage 31, and the other side thereof is connected to the accumulator 15b2 via a hydraulic passage 35 and the hydraulic passage 32 which is connected to the hydraulic passage 35.

The operation of the regulator 15a will be explained briefly hereinafter. In the case where the pilot pressure (hydraulic pressure in the pilot chamber R11) is not supplied to the pilot chamber R11 from the pressure decreasing valve 15b6 and the pressure increasing valve 15b7, the spool 15a2 is positioned at the original position by means of a biasing force of the spring 15a3 (See FIG. 1). The original position of the spool 15a2 is determined by the abutment of a front end surface of the spool 15a2 against the restricting protrusion 15a4. This original position is the position immediately before a rear end surface of the spool 15a2 closes the port PT14.

As explained, when the spool 15a2 is in the original position, the port PT14 and the port PT12 are in fluid communication with each other through the communication passage 15a5, and at the same time, the port PT13 is closed by the spool 15a2.

In the case where the pilot pressure formed by the pressure decreasing valve 15b6 and the pressure increasing valve 15b7 increases in response to the operation amount of the brake pedal 11, the spool 15a2 moves in a rearward direction (right side in FIG. 1), overcoming the biasing force of the spring 15a3. The spool 15a2 moves to the position where the port PT13, which had been closed by the spool 15a2, opens. The port PT14 which had been in the open state, is closed by the spool 15a2. The position of the spool 15a2 under this state is defined to be the "pressure increasing position". At this time, the port PT13 and the port PT12 are in fluid communication with each other through the output chamber R12.

By the force balance between the pushing force at the front end surface of the second large diameter portion 15a2b of the spool 15a2 and a resultant force of the force corresponding to the servo pressure and the biasing force of the spring 15a3, the position of the spool 15a2 is fixed. This position of the spool 15a2 is defined to be the "holding position". The port PT13 and the port PT14 are closed by the spool 15a2 at the holding position.

In the case where the pilot pressure formed by the pressure decreasing valve 15b6 and the pressure increasing valve 15b7 decreases in response to the operation amount of the brake pedal 11, the spool 15a2 which is in the holding position now moves in a frontward direction by the biasing force of the spring 15a3. Then, the port PT13 which had been in the closed state by the spool 15a2 keeps the closed state. The port PT14 which had been in the closed state is open. The position of the spool 15a2 under this state is defined to be the "pressure decreasing position". Under this state, the port PT14 and the port PT12 are in fluid communication with each other through the communication passage 15a5.

The above explained booster mechanism 15 generates pilot pressure in response to a stroke of the brake pedal 11 by the pressure decreasing valve 15b6 and the pressure increasing valve 15b7 and generates servo pressure which responds to the stroke of the brake pedal 11 by the pilot pressure. The generated servo pressure is supplied to the servo chamber R5 of the master cylinder 12, and the master cylinder 12 supplies the wheel cylinder WC with the master pressure generated in response to the stroke of the brake pedal 11. The pressure decreasing valve 15$b6$ and the pressure increasing valve 15$b7$ form a valve portion which adjusts the inflow or outflow of the brake fluid into or out of the servo chamber R5.

As described above, the hydraulic brake device 100A of the present embodiment is configured by a by-wire system. In other words, the hydraulic brake device 100A has a configuration in which the master pressure can be adjusted independently of the operation of the brake pedal (brake operation member) 11, and further has a configuration in which fluctuation of the master pressure does not directly affect the brake pedal 11.

(Actuator)

Figure 2:
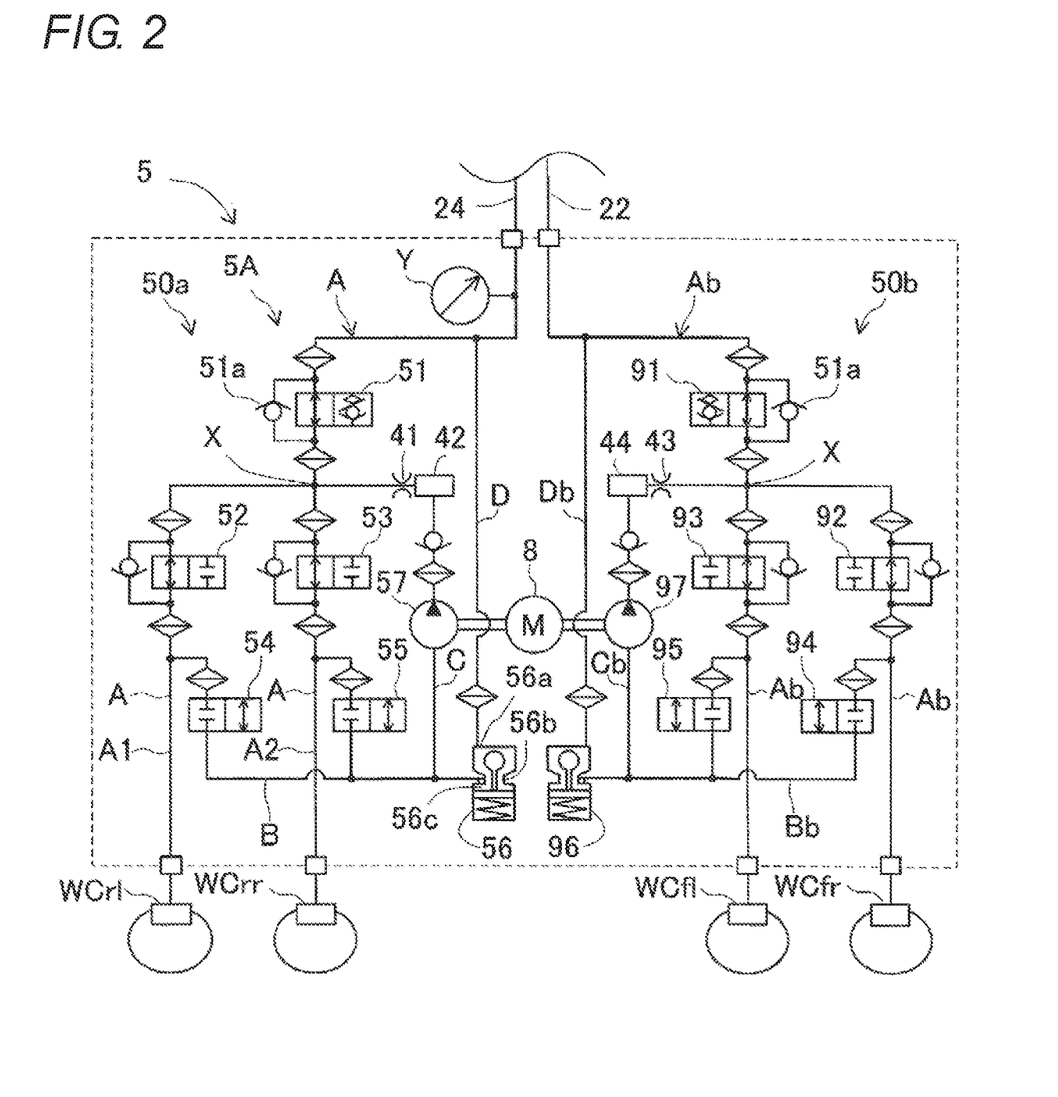
FIG. 2 is a configuration diagram showing a configuration of an actuator of the present embodiment.

The actuator 5 is a device that controls the hydraulic pressure (wheel pressure) of the wheel cylinder WC in accordance with an instruction from the brake ECU 6. Specifically, the actuator 5 is provided with a hydraulic circuit 5A and a motor 8 as shown in FIG. 2. The hydraulic circuit 5A is provided with a first piping system 50$a$ and a second piping system 50$b$. The first piping system 50$a$ is a system that controls the hydraulic pressure (wheel pressure) applied to the wheels Wrl and Wrr. The second piping system 50$b$ is a system that controls the hydraulic pressure (wheel pressure) applied to the wheels Wfl and Wfr. In addition, a wheel speed sensor S is installed for each of the wheels W.

The first piping system 50$a$ is provided with a main pipe line (corresponding to "hydraulic pressure path") A, a differential pressure control valve 51, pressure increasing valves 52 and 53, a pressure decreasing pipe line B, pressure decreasing valves 54 and 55, a pressure regulating reservoir 56, a reflux pipe line C, a pump 57, an auxiliary pipe line D, an orifice portion 41, and a damper portion 42. In the explanatory expression, the pipe line can be replaced with, for example, a hydraulic pressure path, a flow path, a hydraulic passage, a pipe or the like. It can be said that the hydraulic pressure path is a concept including a pipe line, a hydraulic passage, a flow path, and a pipe.

The main pipe line A is a pipe line connecting the hydraulic passage 24 and the wheel cylinders WCrl and WCrr. The differential pressure control valve 51 is an electromagnetic valve provided on the main pipe line A to control the main pipe line A to a communicating state and a differential pressure state. The differential pressure state is a state where the flow path is restricted by the valve and can also be said to be a throttle state. In accordance with a control current based on the instruction from the brake ECU 6, the differential pressure control valve 51 controls a differential pressure (hereinafter also referred to as "first differential pressure") between the hydraulic pressure on the master cylinder 12 side around itself and the hydraulic pressure on the wheel cylinders WCrl and WCrr side. In other words, the differential pressure control valve 51 is configured to be able to control the differential pressure between the hydraulic pressure of the portion on the master cylinder 12 side of the main pipe line A and the hydraulic pressure of the portion on the wheel cylinders WCrl and WCrr side of the main pipe line A.

The differential pressure control valve 51 is of a normally open type put into the communicating state in a non-energized state and is controlled to be in the communicating state in normal brake control except for specific control. Examples of the specific control include automatic brake, anti-skid control, and initial control or replacement control in regenerative cooperation control. As a control current to be applied to the differential pressure control valve 51 increases, the first differential pressure increases. When the differential pressure control valve 51 is controlled to the differential pressure state and the pump 57 is driven, the hydraulic pressure on the wheel cylinders WCrl and WCrr side is larger than the hydraulic pressure on the master cylinder 12 side in accordance with the control current.

The differential pressure control valve 51 is provided with a check valve 51$a$. The main pipe line A branches into two pipe lines A1 and A2 at a branch point X on a downstream side of the differential pressure control valve 51 so as to correspond to the wheel cylinders WCrl and WCrr.

Figure 3:
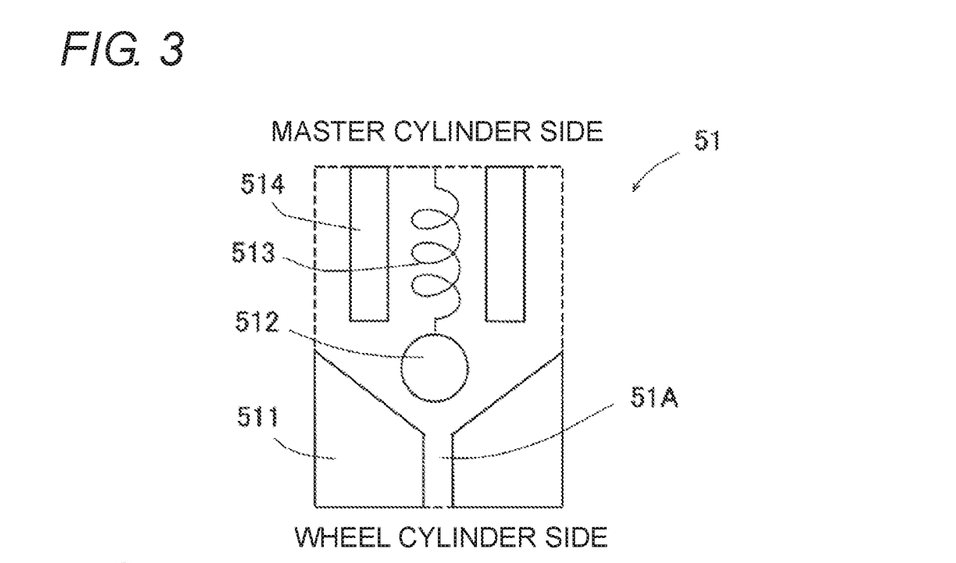
FIG. 3 is a conceptual diagram for explaining a differential pressure control valve.

Here, the configuration of the differential pressure control valve 51 will be conceptually described. As shown in FIG. 3, the differential pressure control valve 51 mainly includes a valve seat 511, a ball valve 512, a spring 513, a solenoid 514, and a flow path 51A. In the differential pressure control valve 51, when the ball valve 512 is seated on the valve seat 511, the flow path 51A is blocked, and when the ball valve 512 is separated, the flow path 51A communicates. The flow path 51A connects a pipe line of the differential pressure control valve 51 on the master cylinder 12 side and a pipe line of the differential pressure control valve 51 on the wheel cylinders WCrl and WCrr side. The ball valve 512 is disposed on the master cylinder 12 side of the valve seat 511, and is fixed to the spring 513 in a state of being separated from the valve seat 511. In the ball valve 512, when the control current is applied to the solenoid 514, the valve seat 511 side is pressed by electromagnetic force. When the ball valve 512 is abutted against (seated on) the valve seat 511 by the electromagnetic force, the flow path 51A is blocked. In a state where no control current is applied to the solenoid 514, the ball valve 512 is returned to an initial position by the spring 513, and the flow path 51A communicates.

Assumption is made in which the pump 57 is driven when the differential pressure control valve 51 is in the differential pressure state, that is, in a state where the control current corresponding to a target differential pressure is applied. In this case, when the hydraulic pressure of the differential pressure control valve 51 on the wheel cylinders WCrl and WCrr side is larger than the hydraulic pressure of the differential pressure control valve 51 on the master cylinder 12 side and when the differential pressure is larger than the target differential pressure, the pushing force due to this differential pressure with respect to the ball valve 512 becomes larger than the pushing force due to the electromagnetic force, and the ball valve 512 slightly moves toward the master cylinder 12 and is separated. As a result, as the ball valve 512 is separated, the brake fluid passes through the flow path 51A and moves toward the master cylinder 12, and the hydraulic pressure on the wheel cylinders WCrl and WCrr side decreases. Then, the pushing force due to the differential pressure decreases, and the ball valve 512 is seated again. By repeating this, the target differential pressure is maintained.

The pressure increasing valves 52 and 53 are electromagnetic valves which are opened and closed according to the instruction from the brake ECU 6, and are normally open type electromagnetic valves which are put into an open state (communicating state) in the non-energized state. The pressure increasing valve 52 is disposed in the pipe line A1, and the pressure increasing valve 53 is disposed in the pipe line A2. The pressure increasing valves 52 and 53 are put into an open state in the non-energized state at the time of pressure increase control to communicate the wheel cylinder WC with the branch point X. The pressure increasing valves 52 and 53 are energized at the time of holding control and pressure decrease control to be put into a closed state and thus to block the communication between the wheel cylinder WC and the branch point X. The pressure increasing valves 52 and 53 may be electromagnetic valves in which the communicating state and the differential pressure state are switched based on the instruction from the brake ECU 6 as with the differential pressure control valve 51. In this case, for example, the pressure increasing valves 52 and 53 are arranged such that "wheel cylinder side" in FIG. 3 is "differential pressure control valve side" and "master cylinder side" is "wheel cylinder side".

The pressure decreasing pipe line B connects a portion between the pressure increasing valve 52 and the wheel cylinder WCrl on the pipe line A1 and the pressure regulating reservoir 56 and connects a portion between the pressure increasing valve 53 and the wheel cylinder WCrr on the pipe line A2 and the pressure regulating reservoir 56. For example, at the time of pressure decrease control, the pressure increasing valves 52 and 53 are controlled to a closed state, and the master cylinder 12 and the wheel cylinders WCrl and WCrr are blocked.

The pressure decreasing valves 54 and 55 are electromagnetic valves which are opened and closed according to the instruction from the brake ECU 6, and are normally closed type electromagnetic valves which are put into a closed state (blocking state) in the non-energized state. The pressure decreasing valve 54 is disposed on the pressure decreasing pipe line B on the side of the wheel cylinder WCrl. The pressure decreasing valve 55 is disposed on the pressure decreasing pipe line B on the side of the wheel cylinder WCrr. The pressure decreasing valves 54 and 55 are mainly energized to be put into an open state at the time of pressure decrease control to communicate the wheel cylinders WCrl and WCrr with the pressure regulating reservoir 56 via the pressure decreasing pipe line B. The pressure regulating reservoir 56 is a reservoir including a cylinder, a piston, and a biasing member.

The reflux pipe line C is a pipe line that connects the pressure decreasing pipe line B (or the pressure regulating reservoir 56) and a portion between the differential pressure control valve 51 and a portion (branch point X in this case) between the pressure increasing valves 52 and 53 on the main pipe line A. The pump 57 is provided in the reflux pipe line C such that a discharge port is disposed on the branch point X side and a suction port is disposed on the pressure regulating reservoir 56 side. The pump 57 is a piston-type electric pump driven by the motor 8. The pump 57 allows the brake fluid to flow from the pressure regulating reservoir 56 to the master cylinder 12 side or the wheel cylinders WCrl and WCrr side via the reflux pipe line C. That is, the actuator 5 is provided with the pump 57 which discharges the brake fluid to the main pipe line A (a portion between the differential pressure control valve 51 and the pressure increasing valves 52 and 53 on the main pipe line A).

The pump 57 is configured to repeat a discharge process for discharging the brake fluid and a suction process for sucking the brake fluid. That is, when driven by the motor 8, the pump 57 alternately repeats the discharge process and the suction process. In the discharge process, the brake fluid sucked from the pressure regulating reservoir 56 during the suction process is supplied to the branch point X. The motor 8 is energized via a relay (not shown) to be driven according to the instruction from the brake ECU 6. It may also be said that the pump 57 and the motor 8 serve as one electric pump. The pump 57 may be driven at all times while the vehicle is running.

The orifice portion 41 is a throttle-shaped portion (so-called orifice) provided in a portion between the pump 57 in the reflux pipe line C and the branch point X. The damper portion 42 is a damper (damper mechanism) connected to a portion between the pump 57 in the reflux pipe line C and the orifice portion 41. The damper portion 42 absorbs and discharges the brake fluid according to pulsation of the brake fluid in the reflux pipe line C. The orifice portion 41 and the damper portion 42 can be said to be a pulsation reduction mechanism that reduces (attenuates and absorbs) the pulsation.

The auxiliary pipe line D is a pipe line that connects a pressure regulating hole 56a of the pressure regulating reservoir 56 and a portion (or the master cylinder 12) on an upstream side of the differential pressure control valve 51 on the main pipe line A. The pressure regulating reservoir 56 is configured that a valve hole 56b is closed as the inflow amount of the brake fluid into the pressure regulating hole 56a increases due to an increase in the stroke. A reservoir chamber 56c is formed on the pipe lines B and C side of the valve hole 56b.

Due to drive of the pump 57, the brake fluid in the pressure regulating reservoir 56 or the master cylinder 12 is discharged to a portion (branch point X) between the differential pressure control valve 51 and the pressure increasing valves 52 and 53 on the main pipe line A via the reflux pipe line C. Then, the wheel pressure is pressurized according to the control states of the differential pressure control valve 51 and the pressure increasing valves 52 and 53. As described above, in the actuator 5, pressurization control is executed by driving the pump 57 and controlling various valves. That is, the actuator 5 is configured to be able to pressurize the wheel pressure. In a portion between the differential pressure control valve 51 and the master cylinder 12 on the main pipe line A, a pressure sensor Y that detects the hydraulic pressure (master pressure) of the portion is provided. The pressure sensor Y transmits a detection result to the brake ECU 6 and the brake ECU 6.

The second piping system 50b has the same configuration as the first piping system 50a and is a system that controls the hydraulic pressures of the wheel cylinders WCfl and WCfr of the front wheels Wfl and Wfr. The second piping system 50b includes a main pipe line Ab corresponding to the main pipe line A and connecting the hydraulic passage 22 and the wheel cylinders WCfl and Wfr, a differential pressure control valve 91 corresponding to the differential pressure control valve 51, pressure increasing valves 92 and 93 corresponding to the pressure increasing valves 52 and 53, a pressure decreasing pipe line Bb corresponding to the pressure decreasing pipe line B, pressure decreasing valves 94 and 95 corresponding to the pressure decreasing valves 54 and 55, a pressure regulating reservoir 96 corresponding to the pressure regulating reservoir 56, a reflux pipe line Cb corresponding to the reflux pipe line C, a pump 97 corresponding to the pump 57, an auxiliary pipe line Db corresponding to the auxiliary pipe line D, an orifice portion 43 corresponding to the orifice portion 41, and a damper portion 44 corresponding to the damper portion 42. For the detailed configuration of the second piping system 50b, the explanation of the first piping system 50a can be referred to, and explanation thereof will be omitted. The piping configuration may be X piping or front and rear piping.

The wheel pressure is regulated by the actuator 5 by performing pressure increase control to provide the master pressure to the wheel cylinder WC, holding control to seal the wheel cylinder WC, pressure decrease control to cause the brake fluid in the wheel cylinder WC to flow out to the pressure regulating reservoir 56, or pressurization control to pressurize the wheel pressure by throttle by the differential pressure control valve 51 and the drive of the pump 57. Thus, the hydraulic brake device 100A includes the master cylinder 12 having the master pistons 12c and 12d and the master chambers R1 and R2 whose volumes change with the movement of the master pistons 12c and 12d, the booster mechanism 15 driving the master pistons 12c and 12d by the force corresponding to the hydraulic pressure of the accumulator 15b2 and controlling the master pressure which is the hydraulic pressure in the master chambers R1 and R2, the flow paths 22, 24, A, and Ab connecting the master chambers R1 and R2 and the wheel cylinder WC, the actuator 5 having the pumps 57 and 97 which discharge the brake fluid to the flow paths A and Ab and configured to be able to pressurize the wheel pressure which is the hydraulic pressure of the wheel cylinder WC, and the brake ECU 6.

(Brake ECU)

The brake ECU 6 is an electronic control unit provided with a CPU, a memory and the like. The brake ECU 6 controls the booster mechanism 15 and the actuator 5 on the basis of the target wheel pressure which is a target value of the wheel pressure. The brake ECU 6 is connected to various sensors via a communication line (not shown), and is also controllably connected to each part of the booster mechanism 15 and the actuator 5 via the communication line (not shown). The control result to the booster mechanism 15 by the brake ECU 6 will be briefly described. In the pressure increase control, the pressure increasing valve 15b7 is put into an open state, and the pressure decreasing valve 15b6 is put into a closed state. In the pressure decrease control, the pressure increasing valve 15b7 is put into a closed state, and the pressure decreasing valve 15b6 is put into an open state. In the holding control, the pressure increasing valve 15b7 and the pressure decreasing valve 15b6 are put into a closed state.

Further, the control result to the actuator 5 by the brake ECU 6 will be briefly described with reference to the control of the wheel pressure of the wheel cylinder WCrl. In the pressure increase control, the differential pressure control valve 51 and the pressure increasing valve 52 are put into an open state, and the pressure decreasing valve 54 is put into a closed state. In the pressure decrease control, the pressure increasing valve 52 is put into a closed state, and the pressure decreasing valve 54 is put into an open state. In the holding control, the pressure increasing valve 52 and the pressure decreasing valve 54 are put into a closed state. In the pressurization control, the differential pressure control valve 51 is put into a differential pressure state (throttle state), the pressure increasing valve 52 is put into an open state, the pressure decreasing valve 54 is put into a closed state, and the pump 57 is driven.

(Ratio Setting)

The brake ECU 6 of the present embodiment includes, as functions, a target wheel pressure setting unit 61, a determination unit 62, a ratio setting unit 63, a first operation control unit (corresponding to "control unit") 64, and a second operation control unit (corresponding to "control unit") 65. The target wheel pressure setting unit 61 calculates and sets the target wheel pressure according to a brake operation of a driver, that is, on the basis of the detection result of the stroke sensor 11c and/or the detection result of the pressure sensor 25b.

Specifically, the flow of the setting of the target wheel pressure in the present embodiment will be described. First, the target wheel pressure setting unit 61 calculates required braking force based on the detected stroke and/or reaction force hydraulic pressure. The target wheel pressure setting unit 61 transmits the calculated required braking force to the hybrid ECU 902. The hybrid ECU 902 executes regenerative control with the required braking force as target regenerative braking force, calculates execution regenerative braking force that is actually outputted regenerative braking force, and transmits the calculated execution regenerative braking force to the brake ECU 6. The target wheel pressure setting unit 61 determines a difference, obtained by subtracting the execution regenerative braking force from the required braking force, as a target hydraulic braking force and sets the wheel pressure corresponding to the target hydraulic braking force to the target wheel pressure. The target wheel pressure setting unit 61 stores a map showing a relationship between the stroke and the required braking force and/or a relationship between the reaction force hydraulic pressure and the required braking force.

The brake ECU 6 of the present embodiment performs control so that the required braking force is satisfied only by the hydraulic braking force until the required braking force becomes constant after the brake operation is started. That is, the brake ECU 6 does not issue a regenerative braking requirement to the hybrid ECU 902 before the required braking force becomes constant, and controls the booster mechanism 15 and the actuator 5 with the calculated required braking force as the target hydraulic braking force. In the control for the rear wheel Wr or the vehicular brake device not provided with the regenerative brake device 900, all the required braking force is output with the hydraulic braking force as with the control immediately after the brake operation is started, and therefore, the wheel pressure corresponding to the required braking force is set to the target wheel pressure. The brake ECU 6 may be set so as to exercise the execution regenerative braking force immediately after the brake operation is started.

The determination unit 62 determines the operating condition of the vehicular brake device 100. Specifically, the determination unit 62 determines whether the brake operation is sudden brake operation on the basis of information acquired from various sensors and the like. When a preset start determination condition is satisfied, the determination unit 62 determines that the brake operation is the sudden brake operation. In the start determination condition of the present embodiment, the wheel speed is equal to or higher than a first determination speed, and an increase gradient of the stroke is equal to or more than a first predetermined value, or an increase gradient of the reaction force hydraulic pressure is equal to or more than a second predetermined value. The brake ECU 6 acquires wheel speed information from the wheel speed sensor S, acquires stroke information from the stroke sensor 11c, and acquires reaction force hydraulic pressure information from the pressure sensor 25b. On the other hand, when the start determination condition is not satisfied, the determination unit 62 does not determine that the brake operation is the sudden brake operation, or determines that the brake operation is not the sudden brake operation.

Further, after determining that the brake operation is the sudden brake operation, the determination unit 62 determines whether the sudden brake operation has been canceled on the basis of the acquired various information. Specifically, when a cancel determination condition is satisfied after making an affirmative determination, the determination unit 62 cancels the determination (affirmative determination) that the brake operation is the sudden brake operation. In the cancel determination condition of the present embodiment, the wheel speed is less than a second determination speed, and the increase gradient of the stroke is less than a third predetermined value, or the increase gradient of the reaction force hydraulic pressure is less than a fourth predetermined value. The second determination speed is lower than the first determination speed, the third predetermined value is smaller than the first predetermined value, and the fourth predetermined value is smaller than the second predetermined value. On the other hand, when the cancel determination condition is not satisfied, the determination unit 62 determines that the sudden brake operation is not canceled, and continues the affirmative determination. Each determination is periodically performed by the determination unit 62. Other determinations will be described later.

Based on the determination result of the determination unit 62, the ratio setting unit 63 sets the first ratio, which is the ratio of the wheel pressure generated by the booster mechanism 15 out of the target wheel pressure set by the target wheel pressure setting unit 61, and a second ratio which is a ratio of the wheel pressure generated by the actuator 5 out of the target wheel pressure. The first ratio corresponds to a ratio of the master pressure to the wheel pressure. The second ratio corresponds to a ratio of a pressure value obtained by subtracting the master pressure from the wheel pressure with respect to the wheel pressure.

In the case where the determination unit 62 determines that the brake operation is the sudden brake operation, the ratio setting unit 63 increases the first ratio, as compared with the case where the determination unit 62 dose not determine that the brake operation is the sudden brake operation. That is, the ratio setting unit 63 increases the first ratio during the sudden brake operation as compared with during normal brake operation (and a case where there is another determination and a case where conditions of the relevant another determination are common). It can also be said that the ratio setting unit 63 executes upstream pressure-priority control to increase the first ratio during the sudden brake operation.

When the determination unit 62 cancels the determination that the brake operation is the sudden brake operation, the ratio setting unit 63 increases the second ratio in response to the cancellation of the determination, as compared with that upon the cancellation of the determination. In the present embodiment, when the determination unit 62 cancels the determination that the brake operation is the sudden brake operation, the ratio setting unit 63 sets the second ratio after the cancellation to be larger than the second ratio upon the cancellation. That is, when the sudden brake operation ends, the ratio setting unit 63 increases the second ratio and reduces the first ratio. A specific example will be described later.

A first operation control unit 64 controls the booster mechanism 15 on the basis of the target wheel pressure and the first ratio. The first operation control unit 64 calculates a first target wheel pressure which is a target value of the wheel pressure generated by the booster mechanism 15 and sets a target servo pressure corresponding to the first target wheel pressure. The first target wheel pressure can be calculated by multiplying the target wheel pressure by the first ratio. The first target wheel pressure corresponds to a target master pressure, and the target servo pressure is determined based on the target master pressure. That is, the first operation control unit 64 sets the target servo pressure on the basis of the first target wheel pressure and controls the booster mechanism 15 on the basis of the target servo pressure. In addition, a dead zone is set for the target servo pressure. The dead zone is a region from a lower limit value of the dead zone with a lower pressure than the target servo pressure to an upper limit value of the dead zone with a higher pressure than the target servo pressure. When the actual servo pressure is a value within the dead zone, the holding control is executed. When the actual servo pressure is lower than the dead zone lower limit value, the pressure increase control is executed. When the actual servo pressure is higher than the dead zone upper limit value, the pressure decrease control is executed.

A second operation control unit 65 controls the actuator 5 on the basis of the target wheel pressure and the second ratio. The second operation control unit 65 calculates a second target wheel pressure which is a target value of the wheel pressure generated by the actuator 5. The second target wheel pressure can be calculated by multiplying the target wheel pressure by the second ratio. The second operation control unit 65 controls the actuator 5 on the basis of the second target wheel pressure.

Figure 4:
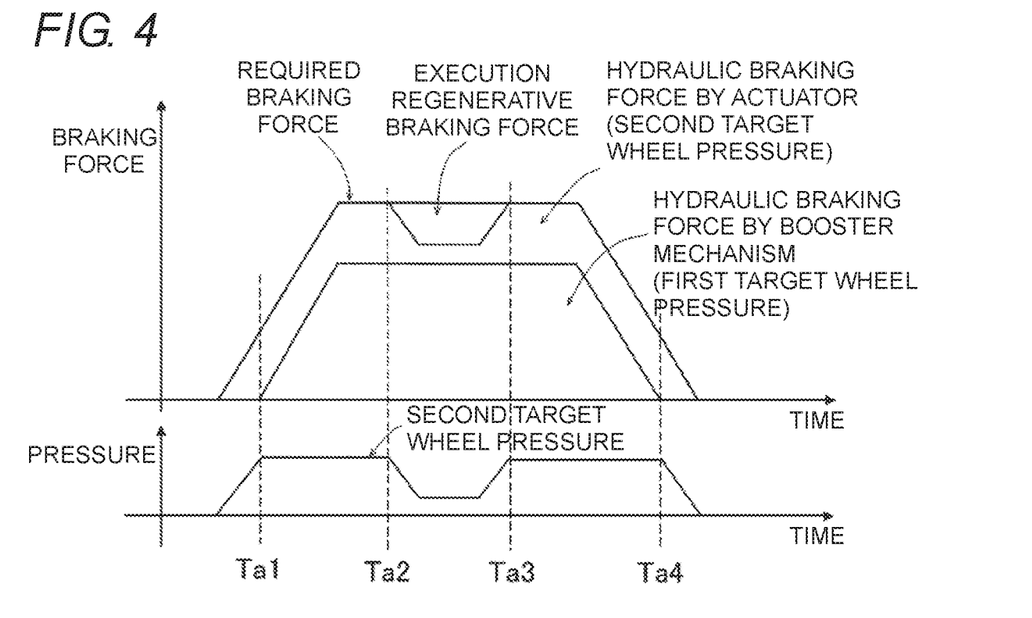
FIG. 4 is a time chart for explaining ratio setting at the time of normal braking according to the present embodiment.

As a specific example of the ratio setting, as shown in FIG. 4, when normal brake operation (non-sudden brake operation) is performed, the second ratio is set to be large immediately after the brake operation is started, and the first ratio gradually increases from the time (Ta1) when the second target wheel pressure reaches a predetermined value. In the present embodiment, a maximum value of the wheel pressure generated by the actuator 5 is set to a predetermined value. In the present embodiment, when normal brake operation is performed, up to Ta1, the second ratio is 1 (100%), and the first ratio is 0. Then, after Ta1, while the required braking force is increasing, the second target wheel pressure is kept constant at a predetermined value, the first target wheel pressure increases, and the first ratio also increases.

The execution regenerative braking force gradually increases from a certain point in time (Ta2) and reaches a maximum regenerative braking force which is a maximum value of the execution regenerative braking force that the regenerative brake device 900 can output, and thereafter, as the vehicle speed decreases, the execution regenerative braking force decreases (Ta2 to Ta3). When a proportion occupied by the execution regenerative braking force in the required braking force increases, the target wheel pressure decreases accordingly. At this time, the brake ECU 6 absorbs the decrease by reducing the second target wheel pressure. That is, when the required braking force is constant, the brake ECU 6 sets the master pressure to be constant and adjusts the increase or decrease of the target wheel pressure according to the magnitude of the execution regenerative braking force by controlling the actuator 5.

After the execution regenerative braking force reaches 0, when the brake operation is operated to the cancellation side at a certain point in time (Ta4) and the required braking force starts to decrease, the master pressure starts to decrease accordingly. That is, when the required braking force is decreasing, the brake ECU 6 decreases the first target wheel pressure while keeping the second target wheel pressure constant at a predetermined value in accordance with the decrease of the target wheel pressure. After the first target wheel pressure reaches 0, the second target wheel pressure decreases as the target wheel pressure decreases.

Figure 5:
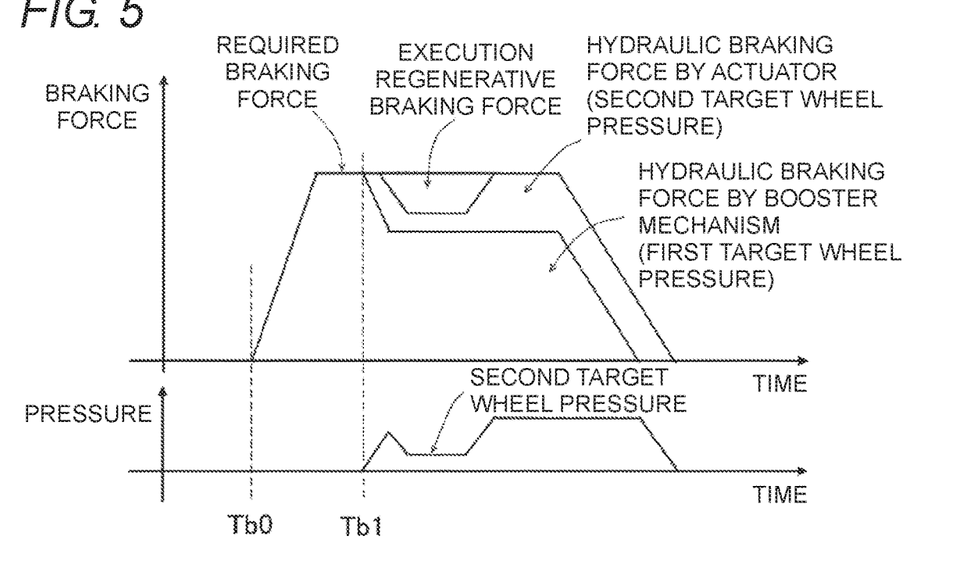
FIG. 5 is a time chart for explaining ratio setting at the time of sudden brake operation according to the present embodiment.

On the other hand, as shown in FIG. 5, when sudden brake operation is performed, from the determination made by the determination unit 62 that the brake operation is the sudden brake operation to the cancellation of this determination (Tb0 to Tb1), the first ratio is set to be larger than that during normal brake operation. In the present embodiment, in Tb0 to Tb1, the first ratio is set to 1, and the second ratio is set to 0. The second ratio gradually increases from Tb1, and the second target wheel pressure increases to a predetermined value while absorbing the increase or decrease of the target wheel pressure due to the execution regenerative braking force. The subsequent control is the same as that during normal brake operation.

The timing (Tb1) at which the second ratio is increased may be determined as the required braking force is held constant for a predetermined period. FIG. 4 and FIG. 5 show a braking force ratio of the front wheel Wf. Although not shown, the second target wheel pressure rises during a period from the start of the brake operation to output of the determination result of the determination unit 62. This phenomenon can be eliminated, for example when the ratio setting unit 63 is set such that the first ratio is 1 for a predetermined time at an initial stage of start of brake operation irrespective of the determination of the determination unit 62.

Figure 6:
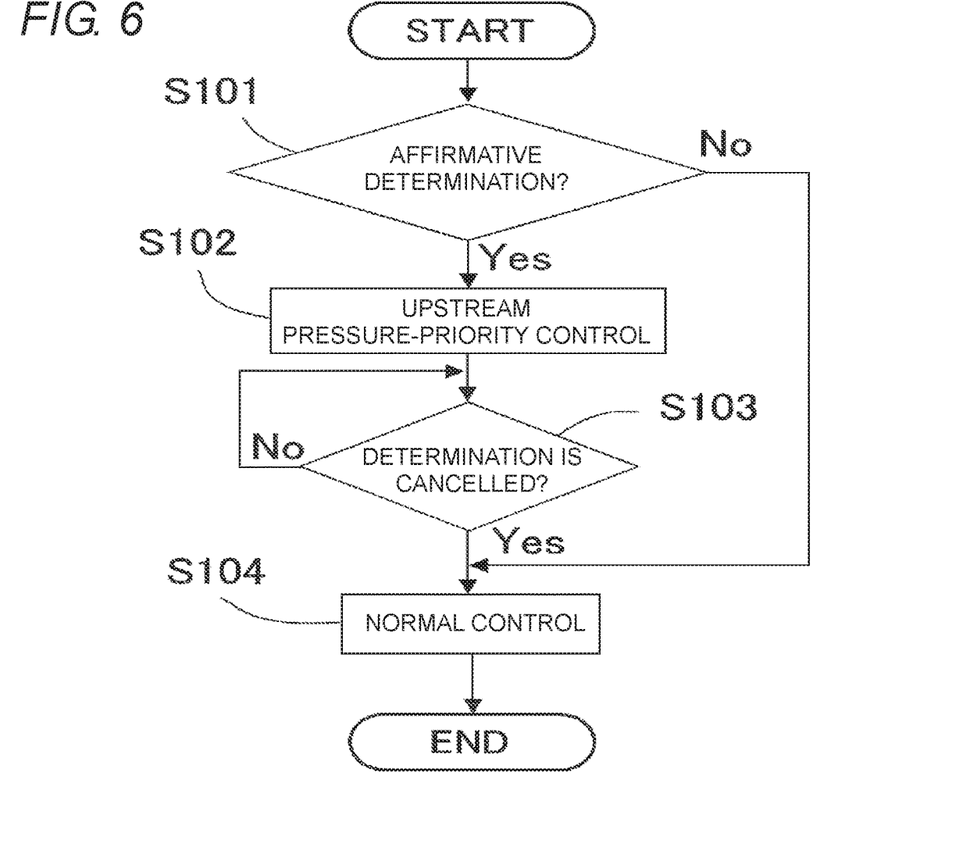
FIG. 6 is a flowchart for explaining an example of a flow of ratio setting according to the present embodiment.

As shown in FIG. 6, when the determination result of the determination unit 62 is affirmative (sudden brake operation) (S101: Yes), the ratio setting unit 63 executes upstream pressure-priority control to increase the first ratio, as compared with a case where the determination result of the determination unit 62 is negative (S102). When the affirmative determination is canceled (S103: Yes), the second ratio is increased as compared with during the upstream pressure-priority control, and the routine goes to normal control (S104). When the determination result of the determination unit 62 is negative (normal brake operation) (S101: No), normal control is also executed (S104). In the upstream pressure-priority control, it is preferable that the first ratio is set to be greater than ½, and furthermore, the first ratio is preferably set to 1.

According to the present embodiment, there are provided two pressure sources (the booster mechanism 15 and the actuator 5) that are controllable by the brake ECU 6 and capable of pressurizing the wheel pressure, and redundancy of pressurized configuration is secured. In addition, since the first ratio relating to the booster mechanism 15 having relatively high responsiveness is set according to the operating condition of the vehicular brake device 100, responsiveness can be improved according to the situation.

The booster mechanism 15 drives the first master piston 12c by the force corresponding to the hydraulic pressure of the accumulator 15b2. In the booster mechanism 15, the master pressure is increased by using the hydraulic pressure of the accumulator 15b2 in which a high-pressure brake fluid is stored in advance, so that the responsiveness is higher than that in pressurization by drive (discharge operation) of the pumps 57 and 97. Therefore, the responsiveness can be improved by increasing the first ratio. For example, initial responsiveness can be also improved by increasing the first ratio at an initial stage of start of brake operation.

Since the dead zone is not set for the second target wheel pressure, the actuator 5 can directly control the target value as compared with the booster mechanism 15, and pressure regulation accuracy is high. Therefore, the pressure regulation accuracy can be improved by increasing the second ratio. For example, differential pressure control by the differential pressure control valve 51 and the pump 57 contributes to an improvement in pressure regulation accuracy.

According to the present embodiment, the first ratio is increased during the sudden brake operation to increase the responsiveness, and when the sudden brake operation ends, the second ratio is increased to return to the same control as that during normal brake operation. Since the second ratio is generated during normal brake operation, the pressure regulation accuracy increases, and brake feeling improves. According to the present embodiment, as shown in FIG. 4 and FIG. 5, the first target wheel pressure can be increased in advance during the sudden brake operation to prioritize the responsiveness, and the second target wheel pressure can be increased in advance during the normal brake operation to prioritize the brake feeling.

In a vehicular brake device of a hybrid vehicle in which only an actuator is a pressure source of the hydraulic braking force, in terms of configuration, an upstream mechanism is not a by-wire system, an amount of fluid in the master chamber fluctuates according to the operation of the actuator, and this causes a brake pedal to fluctuate. However, according to the present embodiment, the hybrid vehicle also adopts the by-wire system which is electronically controllable on the upstream side, so that pedal fluctuation due to the operation of the actuator 5 does not occur.

Second Determination Example

The determination unit 62 may make a determination other than the determination (the first determination example) regarding the sudden brake operation. For example, as a second determination example, the determination unit 62 may determine discharge load of the brake fluid of the pumps 57 and 97 as the operating condition of the vehicular brake device 100. In this case, the ratio setting unit 63 increases the first ratio as the discharge load determined by the determination unit 62 is higher.

For example, the determination unit 62 estimates the wheel pressure from the master pressure (the detection result of the pressure sensor Y) and the control state of the actuator 5 (the second target wheel pressure, etc.), and determines that, as the estimated wheel pressure is higher, the discharge load is higher. That is, the ratio setting unit 63 increases the first ratio as the estimated wheel pressure estimated by the determination unit 62 is higher. The higher the wheel pressure, the more the discharge capability (efficiency) of the pumps 57 and 97 tends to be reduced. When a pressure sensor which detects the wheel pressure is provided in the vehicular brake device 100, the detection result of the pressure sensor may be used for determination.

Figure 7:
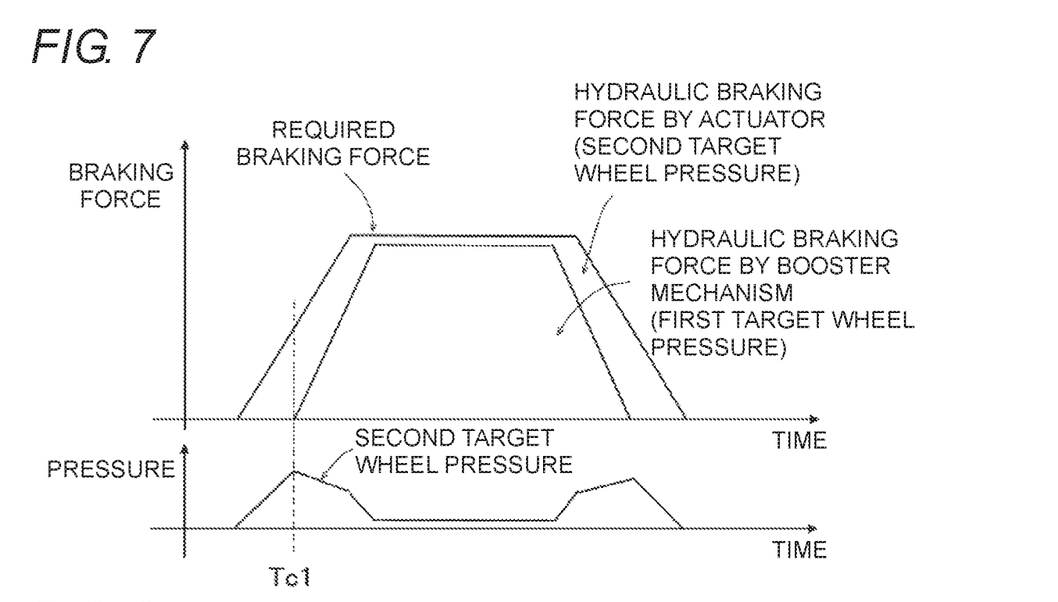
FIG. 7 is a time chart for explaining ratio setting of a second determination example according to the present embodiment.

Explaining the rear wheel Wr (without regenerative braking) as an example, as shown in FIG. 7, when normal brake operation is performed, first, the first ratio is 0, and the second ratio is 1. When the second target wheel pressure reaches a predetermined value (Tc1), the first ratio increases in accordance with an increase in the required braking force. After Tc1, the ratio setting unit 63 decreases the second target wheel pressure from the predetermined value as the discharge load (estimated wheel pressure) determined by the determination unit 62 increases. As a result, in addition to an increase corresponding to the increase in the required braking force, an increase due to a decrease in the second target wheel pressure is added to the first ratio. That is, in this configuration, as compared with a case where the determination unit 62 does not make any determination, the first ratio increases as the discharge load increases. As the estimated wheel pressure decreases, the ratio setting unit 63 brings the second target wheel pressure closer to the predetermined value and increases the second ratio.

According to this configuration, since the first ratio is varied in accordance with the discharge load, the wheel pressure is pressurized by the booster mechanism 15 to satisfy the required braking force even in a situation where the discharge capability of the pumps 57 and 97 may be reduced, and this situation can be avoided.

Third Determination Example

As a third determination example, the determination unit 62 may determine whether there is a difference between the temperature of the booster mechanism 15 and the temperature of the actuator 5 as the operating condition of the vehicular brake device 100. In this case, when it is determined by the determination unit 62 that there is the difference (temperature difference), as the difference is larger, the ratio setting unit 63 causes the booster mechanism 15 or the actuator 5, which is a device on the high temperature side, to generate the wheel pressure with a lower ratio (the first ratio or the second ratio). According to this configuration, it is possible to reduce the load on the device on the high temperature side and to improve durability. In the determination unit 62, each temperature may be measured by a temperature sensor (not shown) provided for each of the devices 15 and 5, or may be estimated by calculation from the operating condition and the like. The temperature difference may be calculated by the determination unit 62 or the ratio setting unit 63.

Figure 8:
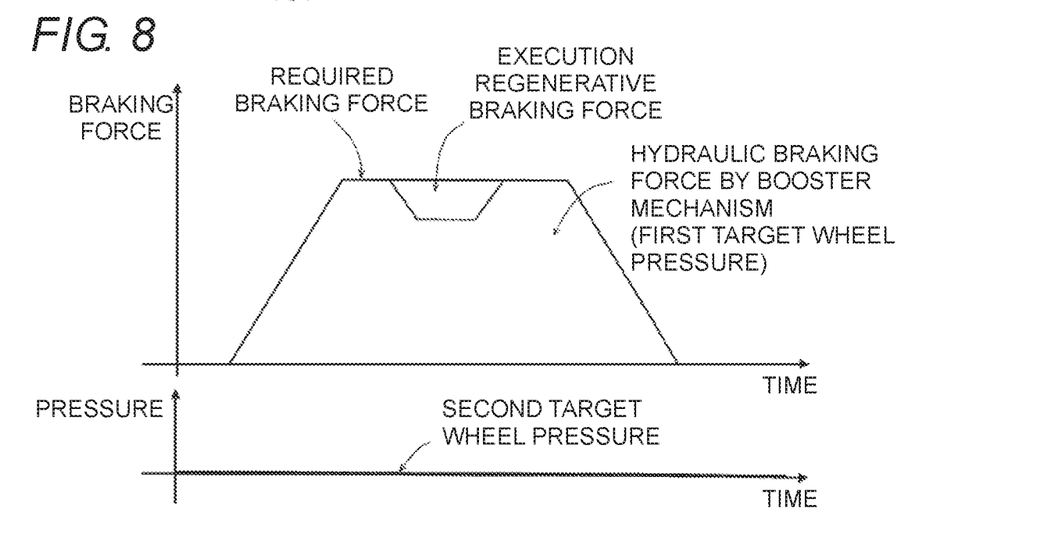
FIG. 8 is a time chart for explaining ratio setting of a third determination example according to the present embodiment.

The front wheel Wf (with regenerative braking) will be explained as an example. The determination unit 62 determines that there is a temperature difference, and when normal brake operation is performed in a situation where the temperature of the actuator 5 is higher than the temperature of the booster mechanism 15 and the temperature difference is equal to or higher than a predetermined temperature, as shown in FIG. 8, while the first ratio is set to 1, the second ratio is set to 0. For example, when this temperature difference is less than the predetermined temperature, the ratio setting unit 63 can also set the second ratio to the ratio at the normal time (the ratio at which correction is not made). The temperature difference and the ratio may have any relationship as long as the ratio of the wheel pressure of the device on the high temperature side becomes smaller as the difference becomes larger, and a stepwise function, a linear function, or the like, or a combination thereof may be used. In this specification, the same expression (English comparative correlative constructions) has the same meaning.

The determination unit 62 may determine whether the temperature state of the actuator 5 is a high temperature state. In this case, in the case where the determination unit 62 determines that the temperature state of the actuator 5 is the high temperature state, the ratio setting unit 63 increases the first ratio, as compared with the case where the determination unit 62 dose not determine that the temperature state is the high temperature state. In other words, when the actuator 5 is in the high temperature state, the ratio setting unit 63 increases the first ratio, as compared with the case where the actuator 5 is not in the high temperature state (and a case where there is another determination and a case where conditions of the relevant another determination are common).

The determination unit 62 determines whether the temperature state is the high temperature state on the basis of the operating condition of the actuator 5 (such as the number of times of operation within a predetermined period of time), for example. For example, in a situation where the actuator 5 frequently operates within a predetermined period of time, such as when a vehicle is traveling on a congested road, the actuator 5 is likely to have heat and tends to be in the high temperature state. When the actuator 5 includes a temperature sensor, the detection result of the temperature sensor may be used for determination.

The front wheel Wf (with regenerative braking) will be explained as an example. When normal brake operation is performed in a situation where the determination unit 62 determines that the temperature state of the actuator 5 is in the high temperature state, as shown in FIG. 8, while the first ratio is set to 1, the second ratio is set to 0. As long as an affirmative determination result (high temperature state) of the determination unit 62 is maintained, the first ratio is also maintained. When the execution regenerative braking force is generated, the first target wheel pressure is increased or decreased and controlled. An affirmative determination cancellation condition may be set, for example, when the actuator 5 does not operate for a predetermined period (long time). According to this configuration, deterioration of durability of the actuator 5 or occurrence of failure due to excessive operation can be suppressed, and continuous operability of the pressure source can be improved.

Fourth Determination Example

As a fourth determination example, the determination unit 62 may determine (detect or calculate) a viscosity correlation value correlating to the viscosity of the brake fluid as the operating condition of the vehicular brake device 100. In this case, the ratio setting unit 63 increases the first ratio as the viscosity correlation value determined by the determination unit 62 is larger. The greater the viscosity of the brake fluid, the greater the load on the pumps 57 and 97. However, according to this example, the greater the viscosity, the greater a ratio to be burdened on devices other than the pumps 57 and 97 (that is, the booster mechanism 15), so that improvement in responsiveness and suppression of abnormal noise can be achieved. Examples of the viscosity correlation value include an outside air temperature and the temperature of the brake fluid that can be obtained by calculation or by various sensors. When the outside air temperature is low, the temperature of the brake fluid decreases, and the viscosity of the brake fluid increases. The viscosity of the brake fluid is related to the outside air temperature and brake fluid.

In a more specific determination example, the determination unit 62 may determine whether the outside air temperature is low as the operating condition of the vehicular brake device 100. In this case, in the case where the determination unit 62 determines that the outside air temperature is low, the ratio setting unit 63 increases the first ratio, as compared with the case where the determination unit 62 dose not determine that the outside air temperature is low. In other words, the ratio setting unit 63 increases the first ratio when the outside air temperature is low, as compared with when the outside air temperature is not low (and a case where there is another determination and a case where conditions of the relevant another determination are common).

The determination unit 62 acquires outside air temperature information from an outside air temperature sensor (not shown) provided in the vehicle, and determines that the outside air temperature is low when the outside air temperature is less than a predetermined temperature. For example, when the outside air temperature is extremely low (for example, less than 0° C.), suction capability (suction property) of the brake fluid of the pumps 57 and 97 decreases, or operation noise is generated by suction of the brake fluid (suction process). However, according to this configuration, the first ratio is increased when the outside air temperature is low, so that it is possible to ensure responsiveness and to suppress an increase in operation noise. When the determination unit 62 determines that the outside air temperature is low, specific examples of the control include the same control as in FIG. 8.

Fifth Determination Example

As a fifth determination example, the determination unit 62 may determine whether the vehicle is stopped as the operating condition of the vehicular brake device 100. In this case, when it is determined by the determination unit 62 that the vehicle is stopped, the ratio setting unit 63 sets the second ratio to zero (0) (that is, sets the first ratio to 1). The determination unit 62 determines whether the vehicle is stopped on the basis of the detection result of the wheel speed sensor S, shift lever position information, and/or side brake information, for example. For example, when the detection result of the wheel speed sensor S is 0, the determination unit 62 determines that the vehicle is stopped. Since there is no road noise while the vehicle is stopped, the operation noise of the pumps 57 and 97 (operation noise of the motor 8) becomes relatively large, and there is room for improvement in an in-vehicle environment. On the other hand, according to this configuration, since the actuator 5 is stopped while the vehicle is stopped, quietness can be improved.

Sixth Determination Example

As a sixth determination example, the determination unit 62 may determine (detect or calculate) the vehicle speed as the operating condition of the vehicular brake device 100. In this case, the ratio setting unit 63 increases the first ratio as the vehicle speed determined by the determination unit 62 decreases. As a result, burden on the actuator 5 at low speed can be reduced.

More specifically, the determination unit 62 may determine whether the vehicle speed is low (less than a predetermined speed) as the operating condition of the vehicular brake device 100. In this case, in the case where the determination unit 62 determines that the vehicle speed is low, the ratio setting unit 63 increases the first ratio, as compared with the case where the determination unit 62 dose not determine that the vehicle speed is low. In other words, the ratio setting unit 63 increases the first ratio when the vehicle speed is low, as compared with when the vehicle speed is not low (in this case, the vehicle speed>0) (and a case where there is another determination and a case where conditions of the relevant another determination are common).

For example, when the detection result of the wheel speed sensor S is less than the predetermined speed, the determination unit 62 determines that the vehicle speed is low. For example, when the vehicle is traveling at an extremely low speed, such as creep (running when the engine is idling), the actuator 5 is constantly driven by the pump for regulating pressure. However, according to this configuration, since the first ratio is increased in such a case, the burden on the actuator 5 is reduced, and the durability of the actuator 5 can be improved. For example, when the vehicle speed is low and when regenerative cooperation is not performed (for example, in the case of the rear wheel Wr or when the regenerative brake device 900 is not provided), the first ratio may be set to 1, and the operation of the actuator 5 may be stopped.

(Others)

The present disclosure is not limited to the above embodiment. For example, the brake ECU 6 may be constituted by two ECUs including an ECU that controls the booster mechanism 15 and an ECU that controls the actuator 5. In this case, the two ECUs are communicably connected. The present disclosure can also be applied to a vehicular brake device (only the hydraulic brake device 100A) without the regenerative brake device 900 and automatic driving/automatic braking.

The booster mechanism 15 may be an electric booster. In this case, the booster mechanism 15 includes a motor constituting the electric booster, and directly drives the first master piston 12c by driving force of the motor. More specifically, although not shown, the booster mechanism 15 includes a ball screw (driving means) whose tip position moves according to the driving of the motor and whose tip position interlocks with the first master piston 12c. In this case, the brake ECU 6 controls the motor of the booster mechanism 15 based on the first target wheel pressure. Even with such a configuration, the booster mechanism 15 exercises relatively high responsiveness, and the same effects as those of the above embodiment are exerted.

The first to sixth determination examples can be combined. That is, the determination unit 62 can execute at least one of the determination on the sudden brake operation, the determination on the discharge load, the determination on the temperature state of the actuator 5, the determination on the outside air temperature, the determination on the stoppage, and the determination on the vehicle speed. When performing a plurality of determinations, the determination unit 62 may weight the respective determination results and set the first ratio and the second ratio, for example.

In addition to the above determinations, the determination unit 62 may also perform determination on the operating condition of the vehicular brake device 100. For example, the determination unit 62 may determine an increase gradient of the target wheel pressure as the operating condition, and the ratio setting unit 63 may increase the first ratio as the increase gradient of the target wheel pressure determined by the determination unit 62 is larger. This also makes it possible to improve responsiveness according to the situation.

For example, the determination unit 62 may determine whether the brake operation has been started as the operating condition. When it is determined by the determination unit 62 that the brake operation is started, the ratio setting unit 63 may increase the first ratio by generating the first target wheel pressure as long as possible, for example, for a predetermined period. When the first target wheel pressure is generated, it is possible to improve responsiveness as compared with the case of only the second target wheel pressure. In this case, the first ratio is preferably set to ½ or more and more preferably set to 1, so that the responsiveness can be further improved. The start determination condition or the cancel determination condition in the determination on the sudden brake operation by the determination unit 62 is not limited to the above condition, and may be set based only on the stroke information and/or the reaction force hydraulic pressure information, for example.

The invention claimed is:
1. A vehicular brake device comprising:
a master cylinder having a master piston and a master chamber whose volume changes with movement of the master piston;
a piston drive unit that drives the master piston by a force corresponding to a hydraulic pressure of an accumulation unit or a driving force of a motor constituting an electric booster and controls a master pressure which is a hydraulic pressure in the master chamber;
a hydraulic pressure path connecting the master chamber and a wheel cylinder;
a hydraulic pressure adjusting unit that has a pump discharging a fluid to the hydraulic pressure path and is configured to be able to pressurize a wheel pressure which is a hydraulic pressure of the wheel cylinder; and
a control unit, said control unit comprising:

a determination unit that determines an operating condition of the vehicular brake device;

a target wheel pressure setting unit that sets a target wheel pressure which is a target value of the wheel pressure;

a ratio setting unit that sets, based on a determination result of the determination unit, a first ratio which is a percentage of the target wheel pressure generated by the piston drive unit and a second ratio which is a percentage of the target wheel pressure generated by the hydraulic pressure adjusting unit; and an operation control unit that controls the piston drive unit and the hydraulic pressure adjusting unit based on the first ratio and the second ratio, wherein the determination unit determines whether the operating condition of the vehicular brake device is a sudden brake operation during which a sudden braking operation is performed, and in a case where the determination unit determines that the operating condition of the vehicular brake device is the sudden brake operation, the ratio setting unit increases the first ratio, as compared with a case where the determination unit does not determine that the operating condition of the vehicular brake device is the sudden brake operation.

2. The vehicular brake device according to claim 1, wherein when the determination unit cancels the determination that the operating condition of the vehicular brake device is the sudden brake operation, the ratio setting unit increases the second ratio after the cancellation of the determination, as compared to the second ratio at the cancellation of the determination.

3. The vehicular brake device according to claim 1, wherein the determination unit determines that the operating condition of the vehicular brake device is an increase gradient of the target wheel pressure operating condition in which the target wheel pressure is increasing at an increase gradient, and the ratio setting unit increases the first ratio when the determination unit determines that the increase gradient of the target wheel pressure is increasing.

4. The vehicular brake device according to claim 1, wherein the determination unit determines that the operating condition of the vehicular brake device is a pump discharge load operating condition in which the discharge load of fluid from the pump is determined, and the ratio setting unit increases the first ratio as the determination unit determines that the discharge load of the fluid from the pump is increasing.

5. The vehicular brake device according to claim 1, wherein the determination unit determines that the operating condition of the vehicular brake device is a temperature difference operating condition in which the determination unit determines whether there is a difference between a temperature of the piston drive unit and a temperature of the hydraulic pressure adjusting unit, and when the determination unit determines that there is the difference between the temperature of the piston drive unit and the temperature of the hydraulic pressure adjusting unit, the ratio setting unit causes the piston drive unit or the hydraulic pressure adjusting unit, whichever of which has the higher temperature, to generate the wheel pressure with a lower of the first and second ratios.

6. The vehicular brake device according to claim 1, wherein the determination unit determines that the operating condition of the vehicular brake device is a viscosity correlation value operating condition in which a measured parameter is correlated to viscosity of the fluid, and the ratio setting unit increases the first ratio when the determination unit determines from the measured parameter that the viscosity of the fluid is larger as compared to when the determination unit determines from the measured parameter that the viscosity of the fluid is not larger than the value.

7. The vehicular brake device according to claim 1, wherein the determination unit determines that the operating condition of the vehicular brake device is a vehicle stopped operating condition in which the vehicle is stopped, and when the determination unit determines that the vehicle is stopped, the ratio setting unit sets the second ratio to zero.

8. The vehicular brake device according to claim 1, wherein the determination unit determines that the operating condition of the vehicular brake device is a vehicle speed operating condition, and when the determination unit determines that the vehicle speed is decreasing, the ratio setting unit increases the first ratio.

* * * * *